G. H. JOHNSON.
SOLID RUBBER TIRE TRIMMING TOOL.
APPLICATION FILED DEC. 30, 1918.
1,319,287.
Patented Oct. 21, 1919.
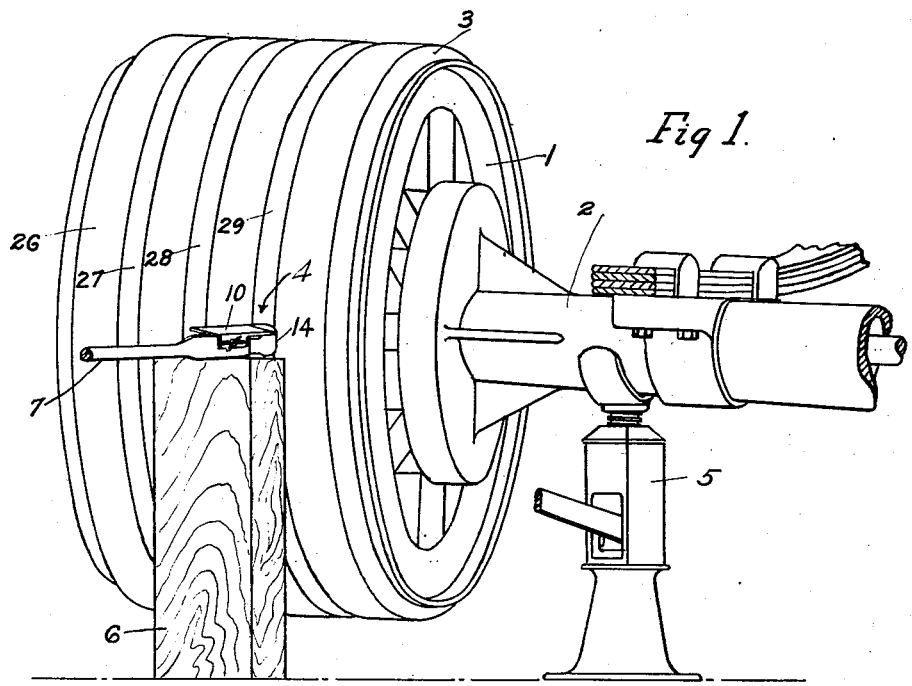
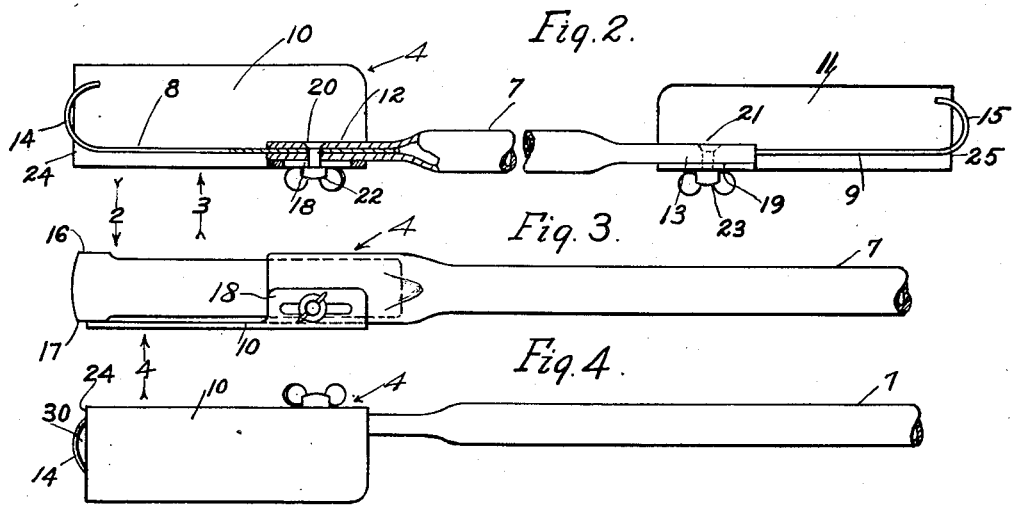
INVENTOR.
George H Johnson.
BY Hazard & Miller
ATTORNEY.

UNITED STATES PATENT OFFICE.

GEORGE H. JOHNSON, OF LOS ANGELES, CALIFORNIA.

SOLID-RUBBER-TIRE-TRIMMING TOOL.

1,319,287.  Specification of Letters Patent.  Patented Oct. 21, 1919.

Application filed December 30, 1918. Serial No. 268,971.

*To all whom it may concern:*

Be it known that I, GEORGE H. JOHNSON, a citizen of the United States, residing at Los Angeles, in the county of Los Angeles and State of California, have invented new and useful Improvements in Solid-Rubber-Tire-Trimming Tools, of which the following is a specification.

My object is to make a trimming tool for use in refacing solid rubber tires, and my invention consists of the novel features herein shown, described and claimed.

Figure 1 is a fragmentary perspective illustrating the operation of trimming a solid rubber tire in accordance with the principles of my invention.

Fig. 2 is a bottom plan view of a trimming tool embodying the principles of my invention, the central portion of the handle being broken away to shorten the view, and the view being taken looking in the direction indicated by the arrow 2 in Fig. 3.

Fig. 3 is a side elevation looking in the direction indicated by the arrow 3 in Fig. 2.

Fig. 4 is a top plan view as seen looking in the direction indicated by the arrow 4 in Fig. 3.

Referring to Fig. 1, the driving wheel 1 upon the automobile truck axle 2 has a wide, heavy, solid rubber tire 3, and after considerable use the face of the rubber tire 3 becomes ragged and the best way to save the tire is to reface it, thereby cutting away the ragged portions and making a smooth surface, and for this purpose I provide a trimming tool 4. When it is desired to reface the tire 3, a jack 5 is placed under the axle to raise the wheel 1 from the ground, the power is applied to rotate the wheel, a tool rest 6 is placed in position, and the tool 4 is operated in a manner similar to a hand turning tool.

The trimming tool 4 consists of a long iron pipe handle 7, cutters 8 and 9 extending from the ends of the handle, and depth gages 10 and 11 adjustably mounted relative to the cutters. The ends of the handle 7 are flattened to form flat sockets 12 and 13. The cutters 8 and 9 are made from flat bars of tool steel, and the inner ends of the bars are mounted in the sockets 12 and 13. The outer ends 14 and 15 of the bars are bent to semicircles, and both edges 16 and 17 are sharpened. The cutting edges 16 and 17 are on a line crosswise of the axis of the handle 7, and the only difference in the outer ends 14 and 15 is that one is larger than the other, so that when a small cutter is desired, the handle is turned one way, and when a larger cutter is desired, the handle is reversed.

The depth gages 10 and 11 are flat plates having longitudinally slotted ears 18 and 19 bent at right angles to the bodies of the plates and fitting against the outer sides of the sockets 12 and 13. Bolts 20 and 21 are inserted through the sockets 12 and 13, through the cutters 8 and 9 and through the ears 18 and 19 to hold the parts together, and nuts 22 and 23 are applied to the bolts, so that by loosening the nuts the depth gages 10 and 11 may be adjusted relatively to the cutting edges, and so that by tightening the nuts the parts are held rigidly together for operation. The outer ends 24 and 25 of the depth gages are straight in lines transverse of the axis of the handle 7, and these edges fit the curved cutting edges 16 and 17, so that the depth to which the cutter will enter the tire may be regulated by adjusting the gage.

In trimming the tire 3, I first go back and forth across the tire to make a flat face 26, and then I operate the tool to make the grooves 27, 28 and 29. The tool support 6 may be a plank, a box, or any suitable thing which will rest upon the ground and extend to the desired height along the side of the wheel.

The cutters 8 and 9 being constructed by bending a flat piece of steel, are comparatively thin, and the concavity formed by bending the metal extends from one edge to the other, thus making the cutter self-cleaning, and the strip of rubber removed from the wheel by the cutter will pass readily down through this concavity in front of the depth gages. In the operation of the tool the depth gages are on top.

Referring to Fig. 4, the ribbon of rubber which is being removed by the cutter will pass downwardly through the opening 30 between the cutter 14 and the working face 24 of the depth gage 10. The plate upon which the face 24 is formed is considerably wider than the cutter 14, so that the edge 24 may bear upon the flat face 26 in cutting the groove 27, and the depth of the groove will be adjusted by adjusting the cutter back and forth relative to this edge 24. When the cutting edge 17 is upwardly and in use the edge 16 is resting upon the tool rest 6 and the tool rest will prevent the ribbon of rubber from passing straight down through the cutter, but as the semicircular cutter has only one arm the ribbon may pass freely along this arm under the plate 10 and outwardly.

Various changes may be made without departing from the spirit of my invention as claimed.

I claim:—

1. A trimming tool for refacing solid rubber tires comprising a handle; a shank extending from the handle; a cutter having one end fitting in the shank; a depth gage alongside of the cutter and having a slotted ear fitting against the side of the shank; and a bolt inserted through the shank, through the cutter and through the ear, so that by loosening the bolt the depth gage may be adjusted relative to the cutter.

2. A trimming tool comprising a handle; a shank extending from the handle; a cutter formed of flat metal and having an end fitting in the shank and a curved end having cutting edges; a depth gage having a straight edge fitting against a cutting edge and a slotted ear fitting against the shank; and a bolt inserted through the parts to hold the parts together and to hold the depth gage in its adjusted position.

3. A trimming tool for refacing solid rubber tires comprising a pipe handle having flattened ends to form sockets, cutters fitting in the sockets and extending outwardly; and depth gages adjustably mounted relative to the cutters.

In testimony whereof I have signed my name to this specification.

GEORGE H. JOHNSON.